UNITED STATES PATENT OFFICE.

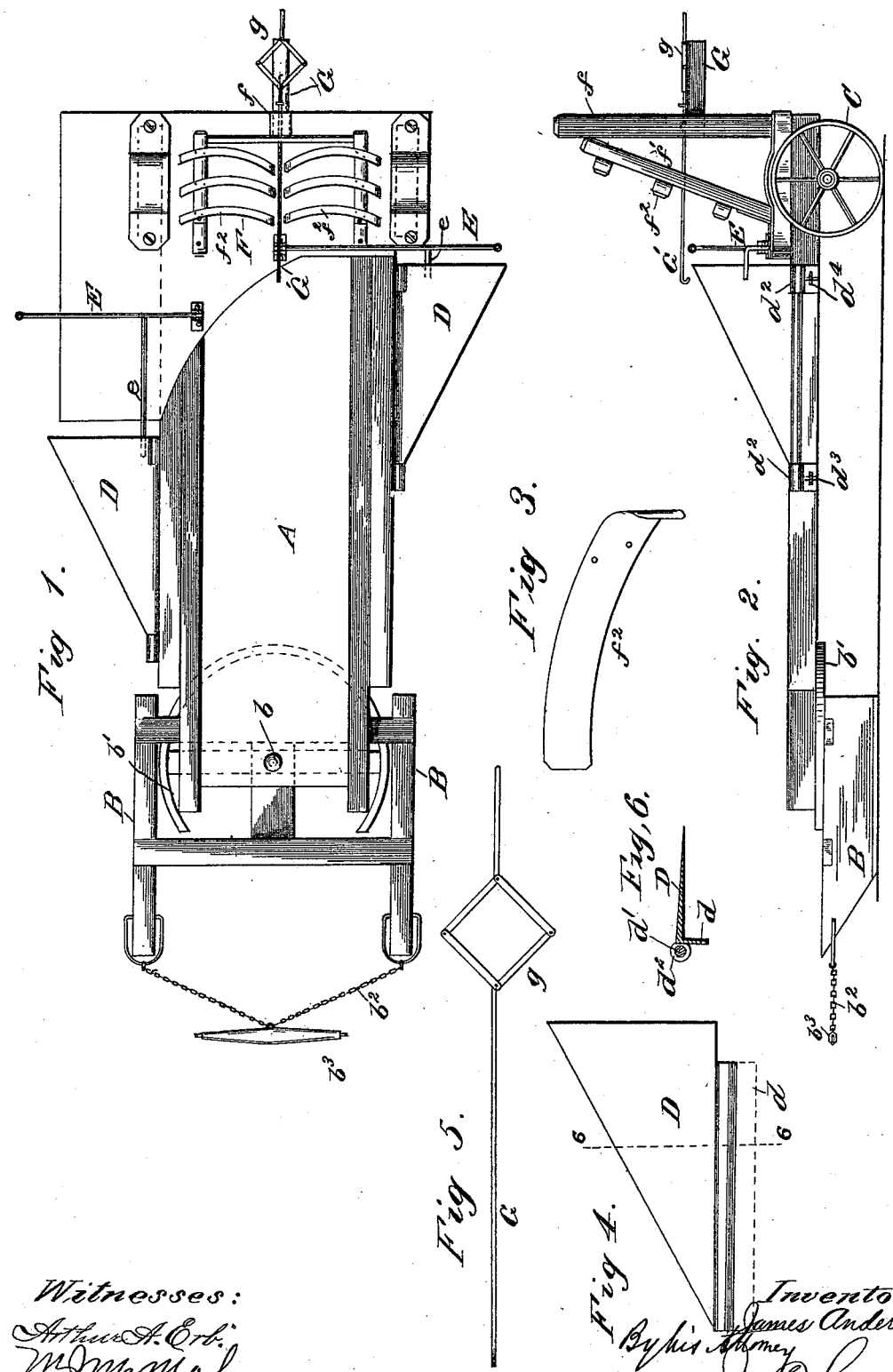

JAMES ANDERSON, OF NEVADA, MISSOURI.

CORN-HARVESTER.

SPECIFICATION forming part of Letters Patent No. 517,830, dated April 10, 1894.

Application filed July 7, 1892. Serial No. 439,255. (No model.)

*To all whom it may concern:*

Be it known that I, JAMES ANDERSON, a citizen of the United States, residing at Nevada, in the county of Wyandot and State of Ohio, have invented certain new and useful Improvements in Corn-Harvesters; and I do hereby declare that the following is a full, clear, and exact description of the invention, which will enable others skilled in the art to which it appertains to make and use the same.

This invention relates to an improved corn harvester and binder, the object of the invention being to provide a device of this character that shall be exceedingly cheap and simple in construction, and highly efficient in operation.

A further object of my invention is to provide means for shocking the corn after severance.

With these various objects in view, my invention consists in the details of construction and novelties of combination hereinafter fully described, and pointed out in the claim.

In the drawings forming a part of this specification, and in which the same letters of reference indicate similar parts, Figure 1 is a top plan view of my improved machine. Fig. 2 is a side view of the same. Figs. 3, 4, and 5, are detail views, respectively of one of the supporting arms and knives and of the shock-retaining device. Fig. 6 is a sectional view, taken on the line 6 6, Fig. 4.

In carrying out my invention I employ a platform A supported at its forward end upon a drag frame or sled B and at its rear end by the wheels C. The platform is pivotally connected with the sled by means of a kingbolt $b$ and turns freely upon said bolt, the forward end of the platform being supported by the segmentally curved plate $b'$, secured to the sled and serving the purpose of a fifth wheel. The runners or beams of the sled are quite broad and shod with iron, and when dragged over the ground produce smooth tracks for the wheels C to follow in, said wheels being arranged in line with the runner or beams as clearly shown in Fig. 1. Draft chains $b^2$ are attached to the front of sled and to said draft chains is connected the evener $b^3$, to which the draft animals are secured, thus insuring an evenness of draft for the machine.

Cutter knives or blades D D, are secured to the opposite sides of the platform, one of the knives being secured adjacent to the forward end of platform while the other is secured near the rear end, by means of which arrangement only one hill at a time is cut, and the draft is consequently lightened. The knives are essentially triangular or wedge shape, the point being arranged foremost, and the sides sloping outward which produces a clear even cut. The edges of the knives adjacent to the platform are formed with flanges $d$ which rest against the sides of the platform, and these knives are secured by means of a rod $d'$ secured in bearings $d^2$ upon the sides of the platform, said bearings being vertically adjustable by means of the slot $d^3$ and set screw $d^4$. Either of the knives can be raised by means of a lever E when it is desired not to cut with said blade, as when passing a shock, said levers being each provided with a forwardly-extending arm, $e$, engaging the under side of the knives. Thus, when the levers are thrown inwardly the arms $e$ are elevated, throwing the knives to a perpendicular position.

The rear portion of the platform is elevated as shown and extends at one side in rear of the adjacent knife, to provide a stand for the operator. Upon the raised portion of the platform I arrange my improved shocking device F composed of the vertical post $f$ the inclined posts $f'$ upon each side and carrying the curved supporting arms $f^2$, the latter being adapted to receive and support the stalks after being cut by the knife D.

G designates a bar projecting rearwardly from the post $f$, and upon which is arranged a set of arms, $g$. The latter are four in number, having their ends pivoted together, the rear pivot being secured to the bar G. Connected with the forward pivot of said arms is a forwardly-extending operating rod, $G'$, by means of which the set of arms $g$ is collapsed or extended. The object of this device is to form a foundation for a shock. Thus after a quantity of stalks have been cut, the machine is stopped and the arms $g$ extended by rearward movement of the rod G'. The stalks are then set up in the corners formed by said arms g and the bar G, and tied, when the arms g are withdrawn by drawing forward upon the rod G'.

Having thus described my invention, what I claim is—

As an improvement in corn harvesters, the combination, with a platform provided with cutting knives at each side thereof, of a shocking device comprising an upright post, curved supporting arms, a bar projecting rearwardly from said post, four arms pivotally connected together and having their rear pivot secured to said bar, and a forwardly-extending rod for operating said pivoted arms connected with the forward pivot of the latter; substantially as set forth.

In testimony whereof I affix my signature in presence of two witnesses.

JAMES ANDERSON.

Witnesses:
R. E. POOL,
R. W. POOL.